United States Patent
Takahashi et al.

(10) Patent No.: US 6,265,133 B1
(45) Date of Patent: Jul. 24, 2001

(54) RADIATION CURABLE RESIN COMPOSITION

(75) Inventors: Toshihiko Takahashi, Tsuchiura; Keiko Kato, Shirako Wako; Tsuyoshi Watanabe; Yuichi Eriyama, both of Tsukuba; Takashi Ukachi, Ushiku, all of (JP)

(73) Assignees: DSM N.V., Heerlen (NL); JSR Corporation; Japan Fine Coatings Co., Ltd., both of Tokyo (JP)

( * ) Notice: Subject to any disclaimer, the term of this patent is extended or adjusted under 35 U.S.C. 154(b) by 0 days.

(21) Appl. No.: 09/209,418

(22) Filed: Dec. 11, 1998

Related U.S. Application Data

(63) Continuation of application No. PCT/NL97/00000, filed on Jun. 12, 1997.

(30) Foreign Application Priority Data

Jun. 14, 1996 (JP) ................................. 8-154007

(51) Int. Cl.[7] ...................................... G03F 7/027
(52) U.S. Cl. .................... 430/281.1; 430/288.1; 430/523; 522/83
(58) Field of Search ............... 430/281.1, 288.1, 430/532; 522/83, 100

(56) References Cited

U.S. PATENT DOCUMENTS

| | | | |
|---|---|---|---|
| 4,271,258 | * 6/1981 | Watariguchi | 430/284 |
| 4,562,142 | * 12/1985 | Kakumaru et al. | 430/288 |
| 5,436,279 | 7/1995 | Grundke et al. | 522/14 |
| 5,536,620 | * 7/1996 | Dueber et al. | 430/281.1 |
| 5,700,746 | * 12/1997 | Kutami et al. | 501/201 |

OTHER PUBLICATIONS

Derwent, Abstract of JP07033838: Paste for Tie Bars; Derwent Publications, Ltd.; Feb. 3, 1995.
Japio Abstract of JP07033838; Paste for Tie Bar, Feb. 3, 1995.
Derwent Abstract of, JP6104464A, Abrasion Resistant Printing Ink, Derwent Publications Ltd., Mar. 4, 1986.
Derwent Abstract of EP309783A; Acrylated polepoxide resin with bisphenol and fluorinated alkane–diol–preparation and use as negative photoresist or photocurable dielectric or coating: Derwent Publications Ltd., Apr. 5, 1998.
Derwent Abstract of JP4149280A, Novel photodisc overcoating comp. Derwent Publications Ltd., May 22, 1992.
Derwent Abstract of, JP4106161A, Primer contg. UV absorber double–layer–coated prod., Derwent Publications Ltd. Apr. 8, 1992.

* cited by examiner

*Primary Examiner*—Janet Baxter
*Assistant Examiner*—Rosemary Ashton
(74) *Attorney, Agent, or Firm*—Pillsbury Winthrop LLP

(57) ABSTRACT

A radiation curable resin composition comprising (A) a first linear (meth)acryloyl and aromatic group-containing compound, (B) a second branched (meth)acryloyl group-containing compound, (C) a radiation polymerization initiator, and (D) silica particles having a secondary average particle diameter of 0.5 to 5 $\mu$m. The composition is suitable for use as a printable heat-resistant protective coat which is used for information recording media such as thermosensible recording cards and thermosensible photographic printing paper.

20 Claims, No Drawings

RADIATION CURABLE RESIN COMPOSITION

This application is a Continuation of PCT/NL97/00000 filed Jun. 12, 1997.

BACKGROUND OF THE INVENTION

1. Field of the Invention

The present invention relates to a radiation curable resin composition which has excellent characteristics for adhering to substrates, characteristics avoiding damage when scratched by a nail (hereinafter referred to as "scratch resistance"), light resistance, heat resistance, high temperature marring resistance, fingerprint attachment resistance, and printing aptitude, and, more particularly, to a radiation curable resin composition suitable for use as a printable heat-resistant protective coat which is used for information recording media such as thermosensible recording cards and thermosensible photographic printing paper.

2. Description of Related Art

A protective coating layer is provided in order to improve heat resistance and resistance to marring on the surface of recording media such as rewritable-type thermosensible recording cards and thermosensible photographic printing paper. A UV-curable type acrylate resin composition conventionally used for surface protection of plastic boards and as a protective coat for optical disks has been also used as the material for forming such a protective coating layer. Japanese Patent Application Laid-open No. 4-149280 proposes an overcoating composition for optical disks which comprises tripropylene glycol diacrylate, 2-(2-ethoxyethoxy)ethyl acrylate, and a photopolymerization initiator. The overcoating composition disclosed here exhibits low irritation to skin, has a low viscosity, and when used as an overcoating for optical disks, possesses sufficient coated film hardness and superior resistance to marring. Although such an overcoating material excels in mar resistance at normal temperatures, the material has poor shock resistance when subjected to thermal head contact when used as a protective coat for thermosensible record cards. Thus, mar resistance at high temperatures is a problem of this composition which must be solved. In addition, the protective coating surface produced by this overcoating composition shows inferior resistance to fingerprint attachment. When touched by a finger, a fingerprint trace is easily attached, which not only results in impaired surface transparency, but also makes it difficult to identify the character information and the like recorded in a lower layer of the protective coat layer.

A multi-layer coating of thermosetting resin consisting of a combination of a specific primer material containing an unsaturated double bond and an organopolysiloxane hard coating was proposed in Japanese Patent Application Laid-open No. 4-106161. The articles coated by this material are characterized in their possession of excellent mar resistance, abrasion resistance, and surface glossiness, as well as superb weather resistance of their adhesion characteristics. The organopolysiloxane hard coat disclosed here forms a coating film containing siloxane bonds when hardened. It is expected that the hard coat will exhibit superior mar resistance at high temperatures. This patent further proposes an addition of fine particles of an inorganic oxide to surface coating films in order to improve the surface hardness of the coating film. However, because the hardening is performed by heat, the addition of fine particles of inorganic oxide not only lengthens the hardening time and thereby decreases the productivity, but also a thermosensible layer is caused to deteriorate if used as the thermosensible recording media. Thus, the material is not practical. Moreover, although the overcoat layer with a polysiloxane structure formed possesses superior mar resistance and heat resistance, the coating film has only poor flexibility. If used on a rewriting type thermosensible record card or on thermosensible record paper, cracks are easily produced. In addition, the surface of the overcoating produced in this manner easily repels printing ink and makes favorable printing difficult.

Japanese Patent Application Laid-Open No. 103328/1995 discloses a radiation curable coating composition comprising, 100 parts by weight (hereinafter simply referred to as parts) of polymerizable compounds consisting of:

(A) 20 to 80 parts of an acrylated bisphenol-A epoxy resin wherein the resin comprises 1 to 3 bisphenol-A moieties in average, (B) 5 to 50 parts of a compound comprising a acrylated dipentaerythritol derivative that may comprise polymerised caprolacton and hydrogenated acrylic acid groups, (C) 0 to 40 parts of a compound comprising two acrylate groups and a 1,3-dioxane moiety, and (D) 0 to 40 parts of monomers or prepolymers which are copolymerizable with the compounds (A), (B), and (C);

0–10 parts of a photopolymerization initiator; and

0–150 parts of an organic solvent.

The inventors of the invention of this laid-open patent application claim that this composition has a low viscosity, is easy to apply, and is hardened in a short period of time by irradiation using ultraviolet rays or electronic beams, has excellent processability such as superior adhesion to a substrate and superb bending characteristics, and produces products with a favorable gloss. However, the coating film produced from this composition, when used as a heat resistant protective coating, has inferior scratch resistance and fingerprint attachment resistance.

An object of the present invention is to provide a radiation curable resin composition which is suitable for producing a printable heat resistant protective coating used for thermosensible type information recording media such as a thermosensible recording card and a thermosensible printing photographic paper.

SUMMARY OF THE INVENTION

This object has been achieved in the present invention by a radiation curable resin composition comprising (A) a first linear (meth)acryloyl and aromatic group-containing compound, (B) a second branched (meth)acryloyl group-containing compound, (C) a radiation polymerization initiator, and (D) silica particles having a secondary average particle diameter of 0.5 to 5 μm.

More in particular the radiation curable resin composition comprises as components (A) and (B):

(A) a first (meth)acryloyl group-containing a compound represented by the following formula (1),

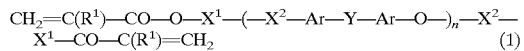

wherein $R^1$ is a hydrogen atom or a methyl group, $X^1$ is a group represented by the following formula (2),

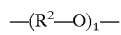

(wherein $R^2$ denotes an alkylene group having 2 to 6 carbon atoms and l is a value from 0 to 5); $X^2$ is a group represented by the following formula (3),

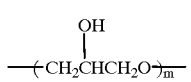

(3)

(wherein m is a value from 0 to 1); Ar represents a divalent aromatic hydrocarbon group such as a phenylene group, bisphenylene group, or naphthylene group, Y is a divalent organic group, and n is a value from 1 to 35; provided that 1+m is 1 or more;

(B) at least one second (meth)acryloyl group-containing compound selected from compounds comprising a pentaerythritol or dipentaerytritol derivative having at least one of an acryloyl, alkoxylated acryloyl, and/or (poly) caprolactonacryloyl group.

DETAILED DESCRIPTION OF THE INVENTION AND PREFERRED EMBODIMENTS (A) First (meth)acryloyl group-containing compounds It is desirable that the first(meth)acryloyl and aromatic group-containing compound used in the present invention is a linear compound, which means that the acryloyl and aromatic groups are linearly connected to each other. Preferably this compound has a bisphenol A structure, that is, a compound having a phenylene group for Ar and an isopropylene group for Y in the formula (1).

Given as specific compounds are a bisphenol A diglycidyl ether polymer with (meth)acrylic acids added to both ends of the molecule (in formula (1) when l=0, m≠0), a bisphenol A propylene oxide polymer with (meth)acrylic acids added to both ends (in formula (1) when m=0, $R^2$=propylene group), and bisphenol A ethylene oxide polymer with (meth)acrylic acids add to both ends (in formula (1) when m=0, $R^2$=ethylene group). As commercially available products of these polymers, given as examples of the (meth)acrylic acid addition bisphenol A-diglycidyl ether polymer are SP-1506, SP-1509SP-1519-1, SP-1563, SP-2500, VR-77, VR-60, and VR-90 (trademarks, manufactured by Showa Highpolymer Co., Ltd.), Viscoat 540 (trademarks, manufactured by Osaka Organic Chemical Industry, Ltd.), epoxy ester 3000A, 3000M (trademarks, manufactured by Kyoeisha Chemical Co., Ltd.); as examples of the (meth)acrylic acid addition bisphenol A propylene oxide polymer are BP-4PA, BP-2PA, epoxy ester 3002A, 3002M (trademarks, manufactured by Kyoeisha Chemical Co., Ltd.); and as examples of the (meth)acrylic acid addition bisphenol A ethylene oxide polymer are SR-349, SR-640, R-712 (trademarks, manufactured by Nippon Kayaku Co., Ltd.), and BPE-10 (trademark, manufactured by Daiichi Kogyo Seiyaku Co., Ltd.).

Among these, particularly preferred polymers are the (meth)acrylic acid addition bisphenol A diglycidyl ether polymer.

The proportion of the first (meth)acryloyl group-containing compound (the component (A)) in the total amount of the components (A) to (D) which make up the composition of the present invention is preferably 20 to 90 wt %, and more preferably 30 to 80 wt %.

(B) Second (meth)acryloyl group-containing compounds

The second (meth)acryloyl group-containing compound used in the present invention is a compound having a branched structure and at least one (meth)acryloyl group. A branched structure means that the compound comprises a derivative from a poly-hydroxy compound, which has three or more hydroxy groups, preferably four to 10 hydroxy groups. More in particular, the compound comprises a pentaeritrytol or dipentaeritrytol derivative having at least one of an acryloyl, alkoxylated acryoyl and/or (poly) caprolacton acryloylgroup. These second (meth)acryloyl group-containing compounds have at least one (meth) acryloyl group in a molecule, and preferably at least about 3. Given as specific examples of these compounds are pentaerythritol tetra(meth)acrylate an ethylene oxide addition product of pentaerythritol esterified with tetra(meth) acrylate, dipentaerythritol penta(meth)acrylate, dipentaerythritol hexa(meth)acrylate and the (meth)acrylate of a copolymer of dipentaerythritol and ε-caprolactone. Preferably, component (B) comprises on average about 4 or more acryloyl groups per molecule.

As commercially available products of these compounds, given as examples of the pentaerythritol tetra(meth)acrylate are KAYARAD PET-30, PET-40 (trademarks, manufactured by Nippon Kayaku Co., Ltd.), PE-4E (trademark, manufactured by Kyoeisha Chemical Co., Ltd.), Viscoat #400 (trademark, manufactured by Osaka Organic Chemical Industry, Ltd.); as an example of the of ethylene oxide addition product of pentaerythritol esterified with (meth) acrylate to obtain a tetra(meth)acrylate is KAYARAD RP-1040 (trademark, manufactured by Nippon Kayaku Co., Ltd.); as an example of the dipentaerythritol penta(meth) acrylate is SR-399 (trademark, manufactured by Nippon Kayaku Co., Ltd.); and as examples of the dipentaerythritol hexa(meth)acrylate are KAYARAD DPHA, DPHA-2C, DPHA-21 (trademarks, manufactured by Nippon Kayaku Co., Ltd.), DPE-6A (trademark, manufactured by Kyoeisha Chemical Co., Ltd.); and as examples of the (meth)acrylate of copolymer of dipentaerythritol and E-caprolactone are KAYARAD D-310, DPCA-20, DPCA-30, DPCA-60, DPCA-120 (trademarks, manufactured by Nippon Kayaku Co., Ltd.). Among these, the penta(meth)acrylate of dipentaerythritol and the (meth)acrylate of dipentaerythritol and ε-caprolactone are preferred.

The proportion of the second (meth)acryloyl group-containing compound (the component (B)) in the total amount of the components (A) to (D) of the composition of the present invention is preferably 10 to 75 wt %, and more preferably 30 to 60 wt %.

(C) Radiation polymerization initiator

The radiation polymerization initiator which is the component (C) used in the present invention may be any compound which is decomposed by irradiation and produces radicals to initiate polymerization.

A photosensitizer may be used in combination if necessary. Here, "radiation" means ultraviolet rays, visible rays, infrared rays, X-rays, electronic beams, α-rays, β-rays, and γ-rays. Given as examples of such radiation polymerization initiators are acetophenone, acetophenone benzyl ketal, anthraquinone, 1-hydroxycyclohexylphenyl ketone, 2,2-dimethoxy-2-phenylacetophenone, xanthone compounds, triphenylamine, carbazole, 3-methylacetophenone, 4-chlorobenzophenone, 4,4'-dimethoxybenzophenone, 4,4'-diaminobenzophenone, 2-hydroxy-2-methyl-1-phenylpropan-1-one, 1-(4-isopropylphenyl)-2-hydroxy-2-methylpropan-1-one, 1,1-dimethoxydeoxybenzoin, 3,3'-dimethyl-4-methoxybenzophenone, diethylthioxanthone, 2-isopropylthioxanthone, 2-chlorothioxanthone, 1-(4-dodecylphenyl)-2-hydroxy-2-methylpropan-1-one,
2-methyl-1-[4-(methylthio)phenyl]-2-morpholinopropan-1-one, triphenylamine, 2,4,6-trimethylbenzoyl diphenylphosphine oxides, bis-(2,6-dimethoxybenzoyl)-2,4,4-trimethylpentylphosphine oxide,
bisacylphosphine oxide, benzyl methyl ketal,
2-hydroxy-2-methyl-1-phenylpropan-1-one, fluorenone, fluorene, benzaldehyde, benzoin ethyl ether, benzoin propyl ether, benzophenone, Michler's ketone,
2-benzyl-2-dimethylamino-1-(4-morpholinophenyl)-butan-1-on e, 3-methylacetophenone,
3,3',4,4'-tetra(t-butylperoxycarbonyl)benzophenone (BTTB), and a combination of BTTB and a coloring matter sensitizer such as xanthene, thioxanthene, cumarin, or ketocumarin, as well as the compound represented by the following formula (4),

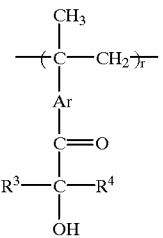

(4)

wherein $R^3$ and $R^4$ are individually an alkyl group having 1 to 5 carbon atoms and Ar stands for a divalent aromatic hydrocarbon group such as a phenylene group, biphenylene group, or naphthylene group, and r is a value from 2 to 50.

Examples of preferred alkyl groups having 1 to 5 carbon atoms in the compound of the formula (4) are a methyl group, ethyl group, n-propyl group, i-propyl group, n-butyl group, t-butyl group, n-pentyl group, and i-pentyl group. Of these, alkyl groups having 1 to 3 carbon atoms are particularly preferred. The value from 2 to 20 for r is preferred.

Among the above compounds, particularly preferred compounds are benzyl methyl ketal, 1-hydroxycyclohexylphenyl ketone, 2,4,6-trimethylbenzoyl diphenylphosphine oxides, bis-(2,6-dimethoxybenzoyl)-2,4, 4-trimethylpentylphosphine oxide, and 2-benzyl-2-dimethylamino-1-(4-morpholinophenyl)-butan-1-one. In addition, Irgacure 184, 651, 500, 907, 369, 784, 2959 (trademarks, manufactured by Ciba Geigy), Lucirin TPO (trademark, manufactured by BASF), Darocur1116, 1173 (trademarks, manufactured by Merck Co.), Ubecryl P36 (trademark, manufactured by UCB Co.), ESCACURE KIP150, ESCACURE KIP100F (trademarks, manufactured by Lamberti Co.) can be given as commercially available products. Given as examples of the photosensitizers are triethylamine, diethylamine, N-methyldiethanoleamine, ethanolamine, 4-dimethylaminobenzoic acids, 4-methyl dimethylaminobenzoate, 4-ethyl dimethylaminobenzoate, 4-isoamyl dimethylaminobenzoate, and commercially available products such as Ubecryl P102, 103, 104, and 105 (trademarks, manufactured by UCB Co.).

The proportion of the above-mentioned radiation polymerization initiator which is the component (C) in the total amount of the components (A) to (D) which constitutes the composition of the present invention is preferably 0.1 to 10 wt %, more preferably 0.5 to 7 wt %, and particularly preferably 1 to 5 wt %. When the amount exceeds 10 wt %, this sometimes adversely affects the curing characteristics of the resinous liquid, the properties of cured products, and handling of the composition. If less than 0.1 wt %, the curing rate may be decreased.

(D) Silica Particles

The component (D) used in the present invention is silica particles having a secondary average particle diameter of 0.5 to 5 μm, and preferably 0.5 to 3.5 μm. The term "secondary particles" here means composite particles produced from a number of flocculated particles, wherein each particle is thought to be a single crystal (primary particle). When the average particle diameter of the secondary particles is smaller than 0.5 μm, the mar resistance and the surface-slipping characteristics are not sufficient; when the particle size of the secondary particles is greater than 5 μm, transparency of the coating film tends to be impaired. The secondary particle diameter is measured with a Coulter average particle diameter method, manufactured by Nippon Silica Inudstries Co. Ltd.

The amount of the silica particles to be added is preferably 0.05 to 2 wt %, more preferably 0.1 to 1.8 wt %, and particularly preferably 0.2 to 1.5 wt %, for the total amount of the components (A) to (D) which constitutes the composition of the present invention. If the amount of silica particles added is less than 0.05 wt %, the mar resistance and fingerprint resistance of the coating films may become insufficient; if more than 2 wt %, transparency of the coating films tends to fall.

Silica particles with an average particle diameter of the secondary particles of 0.5 to 5 μm are commercially available under the trademarks Nipsil E220A, E220, K300, E1011, HD, E743, SS-10F, SS-178B (trademarks, manufactured by Nippon Silica Industries Co.), Sildex H31, H32, L-31 (trademarks, manufactured by Asahi Glass Co., Ltd.), and SO-E2, SO-E3, SO-E5 (trademarks, manufactured by Adomatex Co., Ltd.).

Radiation curable composition

In addition to the component (A), component (B), component (C), and component (D), one or more reactive diluents such as mono-functional monomers and poly-functional monomers other than the component (A) and the component (B) can be used as an optional component in the composition of the present invention. Given as examples of the mono-functional monomer are compounds such as acrylamide, 7-amino-3,7-dimethyloctyl (meth)acrylate, isobutoxymethyl (meth)acrylamide, isobornyloxyethyl (meth)acrylate, isobornyl (meth)acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate and lauryl (meth)acrylate, dicyclopentadiene (meth)acrylate, dicyclopentenyloxyethyl (meth)acrylate, dicyclopentenyl (meth)acrylate, N,N-dimethyl (meth)acrylamide, tetrachlorophenyl (meth) acrylate, 2-tetrachlorophenoxyethyl (meth)acrylate, tetrahydrofurfuryl (meth)acrylate, tetrabromophenyl (meth) acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth) acrylate, phenoxyethyl (meth)acrylate, butoxyethyl (meth)acrylate, pentachlorophenyl (meth)acrylate, pentabromophenyl (meth)acrylate, polyethylene glycol mono(meth)acrylate, polypropylene glycol mono(meth) acrylate, bornyl (meth)acrylate,
methyltriethylene diglycol (meth)acrylate, and
(meth)acryloyl group-containing monomers represented by the following formulas (5) to (7), $$CH_2=C(R^1)-CO-O-(-R^5-O)_s-Ar-R^6 \qquad (5)$$

wherein $R^1$ is a hydrogen atom or a methyl group, $R^5$ is an alkylene group having 2 to 6, preferably 2 to 4, carbon atoms, $R^6$ is a hydrogen atom or an alkyl group having 1 to 12, preferably 1 to 9, carbon atoms, Ar stands for a divalent aromatic hydrocarbon group such as phenylene group, biphenylene group, or naphthylene group, and s is a value from 1 to 12, preferably 1 to 8;

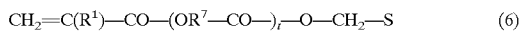

wherein $R^1$ is a hydrogen atom or a methyl group, $R^7$ is an alkylene group having 2 to 8, preferably 2 to 5, carbon atoms, t is a value from 1 to 8, preferably 1 to 4, and S is a tetrahydrofuryl group;

(7)

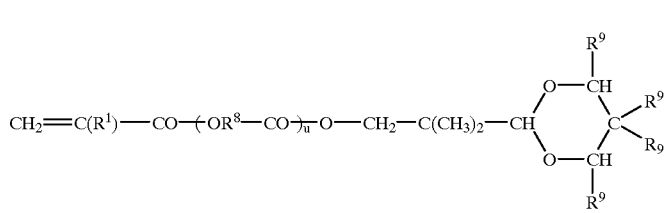

wherein $R^1$ is a hydrogen atom or a methyl group, $R^8$ is an alkylene group having 2 to 8, preferably 2 to 5, carbon atoms, $R^9$ is a hydrogen atom or a methyl group, and u is a value from 1 to 8, preferably 1 to 4; and vinyl group-containing monomers such as N-vinyl carbazole N-vinyl pyrrolidone and N-vinyl caprolactam.

Of these compounds, isobornyl (meth)acrylate, phenoxyethyl (meth)acrylate, N-vinylcarbazole, are particularly preferred.

These mono-functional monomers are commercially available under the trademarks of Aronix M-111, M-113, M-117 (trademarks, manufactured by Toagosei Chemical Industry Co., Ltd.), KAYARAD TC110S, R-629, R-644 (trademarks, manufactured by Nippon Kayaku Co., Ltd.), and Viscoat 3700 (trademarks, manufactured by Osaka Organic Chemical Industry, Ltd.).

The following (meth)acryloyl group containing monomers can be given as examples of the poly-functional monomer: ethylene glycol di(meth)acrylate, dicyclopentenyl di(meth)acrylate, triethylene glycol diacrylate, tetra ethylene glycol di(meth)acrylate, tricyclodecanediyldimethylene di(meth)acrylate, trimethylolpropane tri(meth)acrylate, trimethylolpropane
   trioxyethyl (meth)acrylate, tripropylene diacrylate,
neopentylglycol di(meth)acrylate, bisphenol A-diglycidyl
   ether with (meth)acrylic acid added in both terminals,
1,4-butanediol di(meth)acrylate, 1,6-hexanediol di(meth)
   acrylate, pentaerythritol tri(meth)acrylate,
pentaerythritol tetra(meth)acrylate, polyester di(meth)
   acrylate, and polyethylene glycol di(meth)acrylate.

These poly-functional monomers can be obtained as commercially available products such as Yupimer UV, SA1002 (trademarks, manufactured by Mitsubishi Chemical Co., Ltd.), Viscoat 700 (trademark, manufactured by Osaka Organic Chemical Industry, Ltd.), KAYARAD R-604, DPCA-60, DPCA-30, DPCA-120, HX-620, D-310, D-330 (trademarks, manufactured by Nippon Kayaku Co., Ltd.), Aronix M-210, M-315 (trademarks, manufactured by Toagosei Chemical Industry Co., Ltd.), and the like.

The above-mentioned mono-functional monomers and poly-functional monomers can be used either individually or in combination of two or more. It is desirable to incorporate these monomers into the composition of the present invention in the amount of 40 wt % or less [with respect to components A–D], preferably 30 wt % or less. When this amount is greater than 40 wt %, fingerprints tend to easily adhere to cured products and printability of the composition is impaired.

Various additives can be used in the composition of the present invention as required. Antioxidants, photostabilizers, silane coupling agents, thermal polymerization inhibitors, leveling agents, surfactants, preservatives, coloring agents, UV absorbers, plasticizers, lubricants, inorganic fillers, organic fillers, wettability improvers, coating surface improvers, and the like are included in such additives.

As commercially available antioxidants, Irganox 1010, 1035, 1076, 1222 (trademarks, manufactured by Ciba Geigy) Antigene W, S, P, 3C, 6C, RD-G, FR, AW (trademarks, manufactured by Sumitomo Chemical Industries Co., Ltd.) and the like are given. Tinuvin P, 234, 320, 326, 327, 328, 213 (trademarks, manufactured by Ciba Geigy), Sumisorb 110, 130, 140, 220, 250, 300, 320, 340, 350, 400 (trademarks, manufactured by Sumitomo Chemical Industries Co., Ltd.), and the like are given as examples of the UV absorbers. As commercially available photostabilizers, Tinuvin 292, 144, 622LD (trademarks, manufactured by Ciba Geigy), Sanol LS-770, 765, 292, 2626, 1114, 744 (trademarks, manufactured by Sankyo Chemical Co.), and the like are given. As examples of the silane coupling agent,
γ-aminopropyltriethoxysilane,
γ-mercaptopropyltrimethoxysilane,
γ-acryloxypropyltri-methoxysilane are given, and SH6062,
   SZ6030 (trademarks, manufactured by Toray-Dow Corning Silicone Co.), KBE903, KBM803 (trademarks, manufactured by Shin-Etsu Silicone Co., Ltd.), and the like are given as examples of commercially available silane coupling agents.

Other additives which can be added to the composition of the present invention include epoxy resin;
polymerizable compounds such as urethane acrylate, vinyl
   ether, propenyl ether, and maleic acid derivatives;
polymer or oligomers such as polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer,
   silicon-containing oligomer, and polysulfide oligomer.

In addition, a dilution solvent can be used in the composition of the present invention. Given as examples of such a dilution solvent are alcohols such as methanol, ethanol, isopropyl alcohol, butanol, and cyclohexanol; esters such as ethyl acetate, butyl acetate, isoamyl acetate; ketones such as acetone, methyl ethyl ketone, methyl isobutyl ketone; aromatic hydrocarbons such as benzene, toluene, and xylene; and mixed solvents consisting of two or more of the solvents selected from these solvents. Of these dilution solvents, preferred are ethanol, isopropyl alcohol, or butanol; and mixed solvents consisting of one of these alcoholic solvents, an ester solvent such as ethyl acetate or butyl acetate, and a ketone solvent such as methyl ethyl ketone or methyl isobutyl ketone. The amount of the dilution solvent used in the composition of the present invention differs greatly depending on the coating method. Usually, 0 to 2000 parts by weight is preferably used for 100 parts by weight of the total amount of the composition of the present invention comprising the components (A) to (D) and the additives. More preferably, the amount is 50–500 parts by weight of solvent relative to 100 parts by weight of the total composition.

The order in which various components of the composition of the present invention are mixed is not critical. Usually, from the viewpoint of ease in carrying out the blending and ease of causing the silica particles which form the component(D) to uniformly disperse, the component (D) is added to a mixture comprising the components (A), (B), (C), and the above-mentioned optional components, and the mixture is stirred until the silica particles are uniformly dispersed to obtain the composition of the present invention. Viscosity of the resulting composition is usually 1 to 10,000 cps, preferably 5 to 1,000 cps, at 25° C.

The composition of the present invention can be coated on substrates by commonly used methods. Such coating methods include, for example, dip coating, spray coating, flow coating, roll coating, and screen printing. The thickness of coating films obtained by these coating operations is usually 0.1 to 50 µm, and preferably 1 to 10 µm. After the composition of the present invention has been applied, volatile components are removed at a temperature of 0 to 200° C., preferably 20 to 100° C., and more preferably 40 to 70°, for 1 second to 24 hours, preferably 10 seconds to 1 hour, as required, and then the coatings are cured by irradiation.

Ultraviolet rays are preferably used for curing the composition of the present invention. The ultraviolet rays used should include light with a wave length of 400 nm or below. A metal halide lamp or a mercury lamp (high pressure, medium pressure, or low pressure) can be used as a light source at a dose usually of 0.01 to 10 J/cm2, preferably of 0.1 to 3 J/cm2.

The critical surface tension of the cured coating film thus obtained is usually 20 to 40 dyne/cm, preferably 22 to 37 dyne/cm, and more preferably 25 to 35 dyne/cm. If the critical surface tension of the cured coating film is less than 20 dyne/cm, the adhesion of a printing ink to the coating film may be decreased. If the critical surface tension is greater than 40 dyne/cm, coatability of a printing ink may be impaired. There may be cases where the printing ink is repelled. The critical surface tension in this specification is defined as the value obtained by measuring contact angles of various liquids with a known value of surface tension and the cured coating film, plotting the contact angles along the vertical axis and the values of surface tension (dyne/cm) along the horizontal axis, and extrapolating the plotted line to the point where the contact angle=0°.

EXAMPLES

The present invention will be hereinafter described in more detail by way of examples which are given for illustration of the present invention and shall not to be construed as limiting the present invention. In the descriptions hereinafter "part(s)" means "part(s) by weight" unless otherwise indicated.

1. Preparation of Compositions

Example 1

To a glass vessel equipped with a stirrer were added 70 parts of acrylic acid addition bisphenol A-diglycidyl ether polymer (in the above-mentioned formula (1), n=2.5 to 3.7), as component (A), 30 parts of dipentaerythritol monohydroxy pentacrylate as component (B), 5 parts of 1-hydroxycyclohexyl phenyl ketone as component (C), and 30 parts of butyl acetate, 15 parts of xylene, and 76 parts of isopropyl alcohol, as dilution solvents. The mixture was stirred at room temperature to homogenize, followed by the addition of 0.53 parts of silica particles Nipsil(tm) E220A (secondary particle diameter: 1 to 2 µm determined by the Coulter average particle diameter method, manufactured by Nippon Silica Industries Co., Ltd.), as component (D). The mixture was stirred by a homogenization bar until the silica particles were homogeneously dispersed, thus obtaining a transparent liquid with the composition shown in Table 1.

Examples 2–7

Comparative Examples 1–4

The compositions of these Examples and Comparative Examples were prepared in the same manner as in Example 1 from the components shown in Table 1.

The components in Table 1 are as follows:
Component (A)
- (A)-1: Acrylic acid addition bisphenol A-diglycidyl ether polymer (in the formula (1), l=0, m=1, n=1 to 1.5)
- (A)-2: Acrylic acid addition bisphenol A-diglycidyl ether polymer (in the formula (1), l=0, m=1, n=2.5 to 3.7)
- (A)-3: Acrylic acid addition bisphenol A-propylene oxide polymer (in the formula (1), l=about 2, m=0, n=1, $R^2$=propylene group)

Component (B)
- (B-1): Dipentaerythritol monohydroxy pentacrylate
- (B-2): Pentaerythritol tetracrylate
- (B-3): Acrylate of copolymer of dipentaerythritol and ε-caprolactone Component (C)
- (C)-1: 1-Hydroxycyclohexylphenyl ketone Component (D)
- (D-1): Nipsil(tm) E220A (manufactured by Nippon Silica Industries Co., secondary particle diameter 1–2 µm)

The other component
- (E)-1: Tris[2-(acryloyloxy)ethyl]isocyanurate
- (E)-2: Acryloyl morpholine
- (E)-3: Silicon-containing slipping agent, SH200(tm) (manufactured by Toray-Dow Corning Co.)

TABLE 1

| Component (wt. %) | Example |  |  |  |  |  |  | Comparative Example |  |  |  |
|---|---|---|---|---|---|---|---|---|---|---|---|
|  | 1 | 2 | 3 | 4 | 5 | 6 | 7 | 1 | 2 | 3 | 4 |
| (A)-1 | — | — | 30 | 20 | — | — | — | 100 | — | — | — |
| (A)-2 | 70 | 60 | — | — | — | 70 | 70 | — | 70 | — | 70 |
| (A)-3 | — | — | — | — | 70 | — | — | — | — | — | — |

TABLE 1-continued

| Component (wt. %) | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| (B)-1 | 30 | 40 | 40 | 50 | 30 | — | — | — | — | 70 | 30 |
| (B)-2 | — | — | — | — | — | 30 | — | — | — | — | — |
| (B)-3 | — | — | — | — | — | — | 30 | — | — | — | — |
| (C)-1 | 5 | 5 | 5 | 5 | 5 | 5 | 5 | 5 | 5 | 5 | 5 |
| (D)-1 | 0.53 | 0.53 | 0.53 | 0.53 | 0.53 | 0.53 | 0.53 | — | 0.53 | 0.53 | — |
| (E)-1 | — | — | 10 | 10 | — | — | — | — | 30 | — | — |
| (E)-2 | — | — | 20 | 20 | — | — | — | — | — | 30 | — |
| (E)-3 | — | — | — | — | — | — | — | 1.0 | — | — | — |
| Diluent | | | | | | | | | | | |
| Butyl acetate | 30 | 30 | — | — | 30 | 30 | 30 | — | 30 | 30 | 30 |
| Xylene | 15 | 15 | — | — | 15 | 15 | 15 | — | 15 | 15 | 15 |
| Isopropyl alcohol | 76 | 76 | 245 | 245 | 76 | 76 | 76 | 245 | 76 | 76 | 76 |

2. Application and Curing of the Composition

Each composition was applied to a polyester film (thickness 75 μm, manufactured by Toray Industries, Inc.) or a glass plate using a No.10 bar coater to make a film with a thickness of 5 μm after drying at 90° C. for 10 minutes.

3. Hardening of Composition

Cured coating films were prepared by irradiating the polyester films or glass plates on which the above-mentioned composition was applied with ultraviolet rays using UV irradiation equipment (UBXO311-00(tm) manufactured by Eye Graphics Co., Ltd., light source: a 120 W/cm metal halide lamp) at a irradiation dose of 1.0 J/cm$^2$.

P 4. Evaluation of Cured Coating Films

The above-mentioned cured coating films were evaluated by the following methods. The results are shown in Table 2.

(1) Pencil hardness: The pencil hardness was evaluated according to the JIS K5400 pencil hardness test using cured films on glass plates.

(2) Critical surface tension: Various solvents (wetting index standard solutions, supplied by Wako Pure Chemical Co., Ltd.) with a known surface tension were dropped onto cured coating films on glass plates using a micro-syringe in a room at a temperature of 25° C. and a humidity of 50% to measure contact angles of the drops. A straight line was obtained from the relations between the resulting contact angles and the surface tensions by the method of least squares. The surface tension value at a contact angle of 0° was determined by extrapolation.

(3) Adhesion: Ten (10) cross-cut lines at intervals of 1 mm were produced on the cured coatings made on polyester films. The cross-cut adhesion test was carried out using cellophane tapes according to JIS K5400. The coatings which exhibited no peeling of the ink layer were indicated as O and those which exhibited peeling as X in Table 2.

(4) Scratch resistance: Cured coatings on polyester films were scratched 10 times using a nail. The coatings which exhibited no peeling of the ink layer were indicated as O and those which exhibited peeling as X in Table 2.

(5) Light resistance: Cured coatings produced on glass plates were irradiated for 500 hours using the Q-UV lamp to observe the outward appearance, checking for the presence or absence of cracks or a change in the color. The coatings with no change in outward appearance were indicated as O and those which exhibited any abnormality as X.

(6) Heat resistance: Cured coatings produced on glass plates were placed for 12 hours in a dryer at 150° C. to observe the outward appearance, checking for the presence or absence of cracks. The coatings with no abnormalities in the outward appearance were indicated as O and those which exhibited any abnormality as X.

(7) High temperature mar resistance: Cured coatings on polyester films were repeatedly subjected to a record erasing process 1000 times using a thermal head at a head temperature of 350° C. Presence or absence of scratches on the surface of the coatings by the thermal head was checked. Coatings with almost no scratches produced were indicated as O and those in which scratches were clearly seen were indicated as X.

(8) Fingerprint resistance: A finger wetted with rape seed oil, followed by slight wiping with cotton cloth, was placed on cured coatings made on polyester films to macroscopically observe adhesion or non-adhesion of a fingerprint. The samples with no clear fingerprints were rated as O and those with clear fingerprints were rated as X.

(9) Printability: A solid circle with a diameter of 3 cm was produced on cured coatings made on polyester films with an oil based black marker (manufactured by Pentel Co., Ltd.). Repellency of the oil based black ink was macroscopically observed. Those coatings which repelled ink were rated as O and those which did not repelled ink were rated as X.

TABLE 2

| Test item | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| Pencil hardnes | H | 2H | 6H | 6H | 2H | HB | B | 4B | 6B | 3H | H |
| Critical surface tension (dyne/cm) | 25 | 26 | 30 | 32 | 20 | 22 | 23 | 12 | 22 | 20 | 25 |
| Adhesion | O | O | O | O | O | O | O | O | O | O | O |
| Scratch resistance | O | O | O | O | O | O | O | O | O | O | X |
| Light resistance | O | O | O | O | O | O | O | O | O | O | O |
| Heat resistance | O | O | O | O | O | O | O | O | O | O | O |
| High temperature mar resistance | O | O | O | O | O | O | O | O | X | X | O |
| Fingerprint resistance | O | O | O | O | O | O | O | X | O | O | X |
| Printing aptitude | O | O | O | O | O | O | O | X | X | X | O |

The radiation curable resin composition of the present invention produces cured coatings with excellent adhesion characteristics with substrates, scratch resistance, light resistance, heat resistance, and mar resistance, especially at high temperatures. In addition cured coating films exhibit superior resistance against fingerprint attachment, superb printability, and a high curing speed. The radiation curable resin composition is particularly suitable for the manufacture of a surface protective coating of thermosensible information recording media.

What is claimed is:

1. A radiation curable resin composition comprising
   (A) a first linear (meth)acryloyl and aromatic group-containing compound,
   (B) at least one compound wherein the compound is a pentaerythritol or dipentaerythritol derivative having at least one of an acryloyl, alkoxylated acryloyl, or (poly) caprolactone acryloyl group,
   (C) a radiation polymerization initiator,
   (D) 0.05 to 2 wt %, relative to the total weight of components (A)–(D), of silica particles having a secondary average particle diameter of 0.5 to 5 μm, and
   (E) a non-reactive solvent,
   wherein said composition, after curing, is transparent.

2. Radiation curable resin composition according to claim 1, in which the first (meth)acryloyl group-containing a compound (A) is represented by the following formula (1)

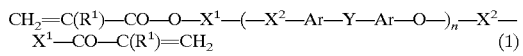
(1)

wherein $R^1$ is a hydrogen atom or a methyl group, $X^1$ is a group represented by the following formula (2),

(2)

(wherein $R^2$ denotes an alkylene group having 2 to 6 carbon atoms and 1 is a value from 0 to 5), $X^2$ is a group represented by the following formula (3),

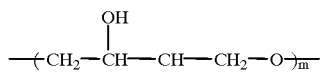
(3)

(wherein m is a value from 0 to 1); Ar represents a divalent aromatic hydrocarbon qroup such as a phenylene group, biphenylene group, or naphthylene group; Y is a divalent organic group and n is a value from 1 to 35.

3. Radiation curable resin composition according to claim 1 wherein component (A) comprises groups derived from bisphenol-A.

4. Radiation curable resin composition according to claim 1, wherein component (A) is present in 20–90 wt. % with respect to components A–D.

5. Radiation curable resin composition according to claim 1, wherein component (B) comprises at least about 4 (meth) acryloyl groups.

6. Radiation curable resin composition according to claim 1, wherein component (B) is present in an amount of 10–75 wt. % with respect to components A–D.

7. Radiation curable resin composition according to claim 1, wherein component (C) is present in an amount of 0.1–10 wt. % with respect to components A–D.

8. Radiation curable resin composition according to claim 1, wherein the silica particles have a secondary average particle diameter of 0.5–5 μm.

9. Radiation curable resin composition according to claim 1, wherein component (D) is present in an amount of 0.02–1.5 wt. % with respect to component A–D.

10. Radiation curable resin composition according to claim 1, wherein the composition further comprises one or more reactive diluents.

11. Radiation curable resin composition according to claim 1, wherein the composition further comprises one or more of an antioxidant, UV absorber, silane coupling agent, inhibitor, or coloring agent.

12. Radiation curable resin composition according to claim 1, wherein the composition comprises 50–500 parts by weight of said non-reactive solvent relative to 100 parts by weight of components A–D and additives.

13. Radiation curable resin composition according to claim 1, wherein the composition has a viscosity of 1–10,000 cps at 25° C.

14. The composition of claim 1, wherein said at least one compound is a pentaerythritol derivative.

15. Protective coating, being a cured resin composition of claim 1.

16. Coating according to claim 15, wherein the coating is printable and heat resistant.

17. Coating according to claim 15, wherein the critical surface tension of the cured coating film is 20–40 dyne/cm.

18. Thermosensible recording card having a protective coating which is at least partly, a coating according to claim 15.

19. Thermosensible photographic printing paper having a protective coating which is at least partly, a coating according to claim 15.

20. A process for the preparation of a radiation curable resin composition by mixing
   (A) a first linear (meth)acryloyl and aromatic group containing compound,
   (B) at least one compound wherein the compound is a pentaerythritol or dipentaerytiritol derivative having at least one of an acryloyl, alkoxylated acryloyl, or (poly) caprolactone acryloyl group,
   (C) a radiation polymerization initiator, and
   (D) 0.05 to 2 wt %, relative to the total weight of components (A)–(D), of silica particles having a secondary average particle diameter of 0.5 to 5 μm.

* * * * *